(12) United States Patent
Chen et al.

(10) Patent No.: US 12,292,579 B2
(45) Date of Patent: May 6, 2025

(54) METHOD AND SYSTEM FOR GENERATING POLARIZED PROPAGATION-INVARIANT LIGHT FIELD

(71) Applicant: SOOCHOW UNIVERSITY, Suzhou (CN)

(72) Inventors: Yahong Chen, Suzhou (CN); Zhen Dong, Suzhou (CN); Xi Sun, Suzhou (CN); Fei Wang, Suzhou (CN); Yangjian Cai, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 522 days.

(21) Appl. No.: 17/800,206

(22) PCT Filed: Dec. 27, 2021

(86) PCT No.: PCT/CN2021/141554
§ 371 (c)(1),
(2) Date: Aug. 16, 2022

(87) PCT Pub. No.: WO2023/103112
PCT Pub. Date: Jun. 15, 2023

(65) Prior Publication Data
US 2023/0314822 A1    Oct. 5, 2023

(30) Foreign Application Priority Data
Dec. 7, 2021  (CN) .......................... 202111481793.X

(51) Int. Cl.
*G02B 27/09*    (2006.01)
*G02B 5/30*     (2006.01)
(Continued)

(52) U.S. Cl.
CPC ....... *G02B 27/0916* (2013.01); *G02B 5/3083* (2013.01); *G02B 5/32* (2013.01); *G02B 27/0955* (2013.01); *G02B 27/1093* (2013.01)

(58) Field of Classification Search
CPC ............ G02B 27/0916; G02B 27/0955; G02B 27/1093; G02B 5/32; G02B 5/3083
(Continued)

(56) References Cited

U.S. PATENT DOCUMENTS
2019/0310484 A1* 10/2019 Galvez .................. G02B 27/14

FOREIGN PATENT DOCUMENTS
CN     102183847 A     9/2011
CN     103676184 A     3/2014
(Continued)

OTHER PUBLICATIONS

Huang et al., Composite vortex beams by coaxial superposition of Laguerre-Gaussian beams, Nov. 12, 2015, Optics and Lasers in Engineering pp. 132-139 (Year: 2015).*

*Primary Examiner* — Wyatt A Stoffa
*Assistant Examiner* — Mitchell T Oestreich
(74) *Attorney, Agent, or Firm* — SZDC Law PC

(57) ABSTRACT

The invention provides a method and a system for generating a polarized propagation-invariant light field. The system includes a laser source, a spatial light modulator, a computer, a first lens, a shading element, a first quarter-wave plate, a second quarter-wave plate, a second lens, and a beam combining element. In the present invention, two Laguerre-Gaussian mode beams that satisfy a particular Gouy order relationship are generated, and orthogonal even polarization is applied to the two Laguerre-Gaussian mode beams. The two Laguerre-Gaussian mode beams are then focused onto a Ronchi grating to be stably combined into polarized propagation-invariant light field. The light field generated in (Continued)

the present invention simultaneously has linear polarization, elliptical polarization, and circular polarization in a cross section of the light field, and in a propagation process of the light field in free space, apart from normal spot size scaling, polarization distribution remains unchanged.

10 Claims, 2 Drawing Sheets

(51) Int. Cl.
*G02B 5/32* (2006.01)
*G02B 27/10* (2006.01)

(58) Field of Classification Search
USPC .............................................................. 359/1
See application file for complete search history.

(56) References Cited

FOREIGN PATENT DOCUMENTS

| | | |
|---|---|---|
| CN | 104950453 A | 9/2015 |
| CN | 110133856 A | 8/2019 |
| CN | 112146760 A | 12/2020 |
| CN | 112904580 A | 6/2021 |
| EP | 3809188 A1 | 4/2021 |

\* cited by examiner

METHOD AND SYSTEM FOR GENERATING POLARIZED PROPAGATION-INVARIANT LIGHT FIELD

This application is the National Stage Application of PCT/CN2021/141554, filed on Dec. 27, 2021, which claims priority to Chinese Patent Application No. 202111481793.X, filed on Dec. 7, 2021, which is incorporated by reference for all purposes as if fully set forth herein.

FIELD OF THE INVENTION

The present invention relates to the field of optical technologies, and in particular to a method and a system for generating a polarized propagation-invariant light field.

DESCRIPTION OF THE RELATED ART

With the development of science and technology and social progress, the regulation and application of light fields have penetrated into military industry, medical treatment, and all aspects of life. Polarization, as an important degree of freedom in the study of light fields, has always been of great research value. In the early 19th century, Marius first discovered the polarization of light. For a long time later, people's knowledge of polarized light fields mainly focused on uniformly distributed polarized light fields, such as linearly polarized light fields, circularly polarized light fields, elliptically polarized light fields. The study of uniformly polarized light fields has produced numerous applications in the fields such as elimination of reflections, manufacturing of liquid crystal panels, and screening of diseased cells. However, uniformly polarized light fields have unvaried forms of polarization states, making it impossible to contain and transmit more beam information, and can no longer meet the needs of optical communication and the like nowadays.

With the gradual development of polarization optics, various non-uniformly polarized light fields are proposed, and the polarization states of such light fields vary at different positions in space and have higher research value and significance. The earliest experimentally generated non-uniformly polarized light fields are radially polarized vector light fields and azimuthally polarized vector light fields, and the polarization states of such light fields are linearly polarization states satisfying circularly symmetric distribution. This type of non-uniformly polarized light fields are called cylindrically symmetric vector light fields, which has been widely studied in this century and has also expanded applications in the aspects such as optical particle manipulation and super-resolution imaging. Although the polarization of this type of light field is non-uniform, the polarization type is still only linear. Later, the American scientist Milione proposed a type of higher-order Poincare sphere based on the intrinsic connection between polarization and orbital angular momentum of light fileds. The light fields represented at any point on the sphere are obtained by the superimposition of right- and left-handed circularly polarized vortex beams carrying the opposite topological charges. The northern hemisphere of the higher-order Poincare sphere represents right-handed non-uniform elliptically polarized light fields, and the southern hemisphere represents left-handed non-uniform elliptically polarized light fields. Compared with the cylindrically symmetric vector light fields that have only linear polarization, the vector light fields of the higher-order Poincare sphere can represent both elliptical polarization and circular polarization. However, it should be noted that after the position of a point on the sphere is determined, a non-uniformly polarized light field represented by the point also has only a single polarization type, either linear polarization or elliptical or circular polarization.

In addition, some complex polarization types of light fields containing all linear, elliptical, and circular polarization have been proposed by scientists to be studied. Beckley et al. combined a type of polarized full Poincare sphere vector light field with multiple types in the cross section by using polarized orthogonal Gaussian beams and Laguerre-Gaussian beams as modes. It is found through research that the full Poincare sphere vector light field is less susceptible to turbulence than the Gaussian light field and the Laguerre-Gaussian light field under the same conditions. The complex polarization state and the anti-turbulence property make the full Poincare sphere vector light field more valuable for research in the field of optical communication. On this basis, Yi et al. used right- and left-handed vortex beams carrying different topological charges as modes to generate hybrid-order Poincare sphere vector light fields. These light fields have complex polarization types and can keep more beam information. However, the polarization states of the combined light fields are always different at different distances due to different change patterns of the two mode beams in a propagation process, which limits their applications in fields such as optical communication.

Existing non-uniform vector polarized light fields are as follows:

1. Radially polarized light may be obtained by superimposing the amplitudes and the like of polarized orthogonal right-handed and left-handed circularly polarized first-order vortex light fields.
2. Higher-order Poincare sphere vector light fields will obtained by superimposing polarized orthogonal right-handed and left-handed circularly polarized vortex light fields with opposite topological charges and controlling an amplitude ratio and a phase ratio between the two vortex light fields.
3. Full Poincare sphere light fields with complex polarization types may be obtained by superimposing polarized orthogonal Gaussian and Laguerre-Gaussian beams as modes.
4. Hybrid-order Poincare sphere light field may be obtained by superimposing polarized orthogonal right-handed and left-handed circularly polarized vortex light with different topological charges.

The foregoing non-uniform vector polarized light fields respectively have the following problems.

1. Scalar light fields has uniform polarization and contains a small amount of beam polarization information.
2. The higher-order Poincare sphere vector light fields only have polarization states of a single polarization type. The transverse cross section of the entire light field is either linear polarization states (for example, a radially polarized light field and an angularly polarized light field) or elliptical polarization states or circular polarization state with the same axial ratio. The polarization type is unvaried, and a small amount of information is contained.
3. Full Poincare vector light fields and hybrid Poincare sphere vector light fields have all linear polarization, elliptical polarization, and circular polarization in the cross sections. However, mode beams for combining such light fields differ greatly and change in different manners during propagation. Therefore, the polarization of a combined light field keeps changing in a propagation process, which is not conducive to the transfer of optical information.
4. Existing light fields cannot meet both conditions that there are all types of polarization and that it can be ensured that a polarization state remains unchanged during propagation.

SUMMARY OF THE INVENTION

A technical problem to be resolved by the present invention is to provide a system for generating a polarized propagation-invariant light field that has a simple structure and adequate stability and keeps a polarization state unchanged in a propagation process.

To resolve the foregoing problem, the present invention provides A system for generating a polarized propagation-invariant light field includes:
  a laser source and a spatial light modulator, where the laser source is configured to generate laser light to enter the spatial light modulator;
  a computer, configured to: generate two holograms, superimpose grating functions of the two holograms to obtain a composite hologram, and load the composite hologram into the spatial light modulator, where the spatial light modulator is configured to modulate the laser light and simultaneously generate a first Laguerre-Gaussian mode beam and a second Laguerre-Gaussian mode beam, and the first Laguerre-Gaussian mode beam and the second Laguerre-Gaussian mode beam satisfy:

$$2p_1+|l_1|=2p_2+|l_2|,$$

where $p_1$ and $p_2$ respectively represent radial indices of the first Laguerre-Gaussian mode beam and the second Laguerre-Gaussian mode beam, and $l_1$ and $l_2$ respectively represent topological charges of the first Laguerre-Gaussian mode beam and the second Laguerre-Gaussian mode beam;
  a first lens, configured to collimate the first Laguerre-Gaussian mode beam and the second Laguerre-Gaussian mode beam;
  a shading element, configured to simultaneously filter out a positive first-order diffracted beam and a negative first-order diffracted beam of the first Laguerre-Gaussian mode beam and the second Laguerre-Gaussian mode beam after the collimation;
  a first quarter-wave plate and a second quarter-wave plate, configured to modulate polarization states of the first Laguerre-Gaussian mode beam and the second Laguerre-Gaussian mode beam after filtering from linear polarization to right-handed circular polarization and left-handed circular polarization orthogonal to each other;
  a second lens, configured to focus the first Laguerre-Gaussian mode beam and the second Laguerre-Gaussian mode beam with the polarization states being circular polarization; and
  a beam combining element, configured to: combine the focused first Laguerre-Gaussian mode beam and second Laguerre-Gaussian mode beam into one beam, and generate a plurality of diffracted beams, to obtain a polarized propagation-invariant light field.

In a preferable embodiment of the present invention, the shading element is a shading plate, a through hole is provided in the shading plate, and the through hole is separately configured to filter out the positive first-order diffracted beam and the negative first-order diffracted beam of the first Laguerre-Gaussian mode beam and the second Laguerre-Gaussian mode beam.

In a preferable embodiment of the present invention, angles between fast axis directions of the first quarter-wave plate and the second quarter-wave plate and a polarization direction of the laser light are respectively 45 degrees and 135 degrees.

In a preferable embodiment of the present invention, the system further includes a neutral density filter, where the neutral density filter is disposed between the laser source and the spatial light modulator, and the laser light generated by the laser source passes through the neutral density filter to enter the spatial light modulator.

In a preferable embodiment of the present invention, the system further including a beam analyzer, disposed behind the beam combining element, and configured to observe a polarization property of the polarized propagation-invariant light field on the beam combining element.

In a preferable embodiment of the present invention, the first lens and the second lens form a 4f system.

In a preferable embodiment of the present invention, a polarization direction of the laser light generated by the laser source is a vertical direction.

In a preferable embodiment of the present invention, the beam combining element is a Ronchi grating.

In a preferable embodiment of the present invention, the Ronchi grating is disposed at a focus of the second lens.

To resolve the foregoing problem, the present invention further provides a method for generating a polarized propagation-invariant light field, including the following steps:
  S1: generating laser light to enter a spatial light modulator;
  S2: generating two holograms, superimposing grating functions of the two holograms to obtain a composite hologram, and loading the composite hologram into the spatial light modulator, where the spatial light modulator modulates the laser light and simultaneously generates a first Laguerre-Gaussian mode beam and a second Laguerre-Gaussian mode beam, and the first Laguerre-Gaussian mode beam and the second Laguerre-Gaussian mode beam satisfy:

$$2p_1+|l_1|=2p_2+|l_2|,$$

where $p_1$ and $p_2$ respectively represent radial indices of the first Laguerre-Gaussian mode beam and the second Laguerre-Gaussian mode beam, and $l_1$ and $l_2$ respectively represent topological charges of the first Laguerre-Gaussian mode beam and the second Laguerre-Gaussian mode beam;
  S3: collimating the first Laguerre-Gaussian mode beam and the second Laguerre-Gaussian mode beam;
  S4: simultaneously filtering out positive first-order diffracted beams and negative first-order diffracted beams of the first Laguerre-Gaussian mode beam and the second Laguerre-Gaussian mode beam after the collimation;
  S5: modulating polarization states of the first Laguerre-Gaussian mode beam and the second Laguerre-Gaussian mode beam after filtering from linear polarization to right-handed circular polarization and left-handed circular polarization orthogonal to each other;
  S6: focusing the first Laguerre-Gaussian mode beam and the second Laguerre-Gaussian mode beam with the polarization states being circular polarization; and
  S7: combining the focused first Laguerre-Gaussian mode beam and second Laguerre-Gaussian mode beam into one beam, and generating a plurality of diffracted beams, to obtain a polarized propagation-invariant light field.

In a preferable embodiment of the present invention, the random phase screen is rotating frosted glass.

The beneficial effects of the present invention are as follows:

In the method and system for generating a polarized propagation-invariant light field of the present invention, two Laguerre-Gaussian mode beams that satisfy a condition $2p_1+|l_1|2p_2+|l_2|$ are generated, and orthogonal uniformly polarization is applied to the two Laguerre-Gaussian mode beams. The two Laguerre-Gaussian mode beams are then focused onto a Ronchi grating to be stably combined into polarized propagation-invariant light field. The light field generated in the present invention simultaneously has linear polarization, elliptical polarization, and circular polarization in a cross section of the light field, and in a propagation process of the light field in free space, apart from normal spot size scaling, polarization distribution remains unchanged.

The above description is only an overview of the technical solutions of the present invention. For a clearer understanding of the technical measure of the present invention and implementation according to the content of the specification, and to make the above and other objectives, features, and advantages of the present invention clearer and more comprehensible, detailed description is provided as follows with reference to preferred embodiments and the accompanying drawings.

Figure 1:
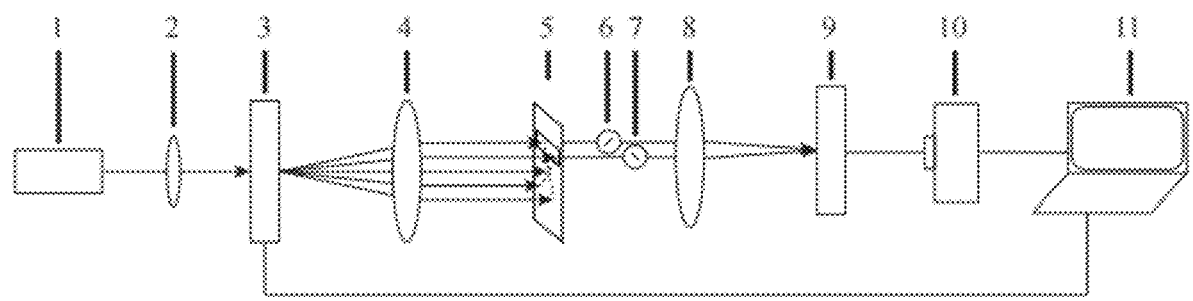
FIG. 1 is a schematic diagram of a system for generating a polarized propagation-invariant light field according to a preferred embodiment of the present invention.

Reference numerals: 1. laser source; 2. neutral density filter; 3. spatial light modulator; 4. first lens; 5. shading element; 6. first quarter-wave plate; 7. second quarter-wave plate; 8. second lens; 9. beam combining element; 10. beam analyzer; 11. computer; and 12. through hole.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Embodiment 1

FIG. 1 shows a system for generating a polarized propagation-invariant light field in this embodiment. The system includes a laser source 1, a spatial light modulator 3, a first lens 4, a shading element 5, a first quarter-wave plate 6, a second quarter-wave plate 7, a second lens 8, a beam combining element 9, and a computer 11.

The laser source 1 is configured to generate laser light to enter the spatial light modulator 3. The computer 11 is configured to: generate two holograms, superimpose grating functions of the two holograms to obtain a composite hologram, and load the composite hologram into the spatial light modulator 3. The spatial light modulator 3 is configured to modulate the laser light and simultaneously generate a first Laguerre-Gaussian mode beam and a second Laguerre-Gaussian mode beam, and the first Laguerre-Gaussian mode beam and the second Laguerre-Gaussian mode beam satisfy:

$$2p_1+|l_1|=2p_2+|l_2|,$$

where $p_1$ and $p_2$ respectively represent radial indices of the first Laguerre-Gaussian mode beam and the second Laguerre-Gaussian mode beam, and $l_1$ and $l_2$ respectively represent topological charges of the first Laguerre-Gaussian mode beam and the second Laguerre-Gaussian mode beam.

Figure 2:
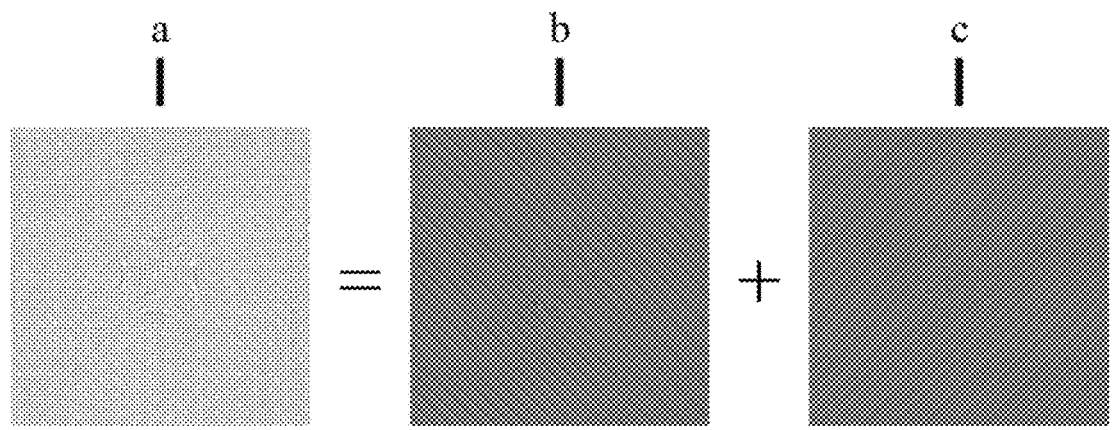
FIG. 2 is a schematic diagram of a composite hologram according to a preferred embodiment of the present invention.

As shown in FIG. 2, b and c are two holograms generated by the computer 11. Optionally, the holograms are generated by using an interference method. An arrangement direction of diffraction orders may be controlled by adjusting an interference item of the holograms.

Optionally, a grating function of the hologram b is $T_b=½(1+R_b)$. $R_b$ is the interference item, and may be adjusted to $R_b=\cos(k_b \cdot x+k_b \cdot y+A_b)$. and y are spatial coordinates. $k_b$ is a period parameter. The same interference is performed in an x direction and a y direction, orders of transmitted beams are arranged in a 45-degree direction. $A_b=l_1 \cdot \theta+\pi \cdot (-Lg_1)$ is a vortex phase generated by Laguerre-Gaussian light. $l_1$ is a topological charge of the first Laguerre-Gaussian mode beam. $\theta$ is an angle in polar coordinates. $Lg_1$ is a Laguerre polynomial of the first Laguerre-Gaussian mode beam. The Laguerre polynomial includes two coefficients $p_1$ and $l_1$. Assume $p_1=1$ and $l_1=3$. The hologram c is generated in a similar manner. A grating function of the hologram c is represented as $T_c=½(1+R_c)$. It should be noted here that the interference item is $R_c=\cos(-k_c \cdot x+k_c \cdot y+A_c)$. Interference is performed in an opposite direction of x, orders of the generated beams may be arranged in a 135-degree direction. $A_c=l_2 \cdot \theta+\pi \cdot (-Lg_2)$ is a vortex phase generated by Laguerre-Gaussian light. $l_2$ is a topological charge of the second Laguerre-Gaussian mode beam. $\theta$ is an angle in polar coordinates. $Lg_2$ is a Laguerre polynomial of the second Laguerre-Gaussian mode beam. The Laguerre polynomial includes two coefficients $p_2$ and $l_2$. Assume $p_2=2$ and $l_2=1$. Because $2p_1+|l_1|=2p_2+|l_2|$ satisfies conditions, two Laguerre-Gaussian mode beams with the same Gouy order and diffraction orders arranged in 45 degrees and 135 degrees may be generated. The grating functions of the holograms b and c are superimposed: $T=T_b+T_c$, so that a composite hologram a is obtained.

The first lens 4 is configured to collimate the first Laguerre-Gaussian mode beam and the second Laguerre-Gaussian mode beam.

The shading element 5 is configured to simultaneously filter out positive first-order diffracted beams and negative first-order diffracted beams of the first Laguerre-Gaussian mode beam and the second Laguerre-Gaussian mode beam after the collimation.

The first quarter-wave plate 6 and the second quarter-wave plate 7 are configured to modulate polarization states of the first Laguerre-Gaussian mode beam and the second Laguerre-Gaussian mode beam after filtering from linear polarization to right-handed circular polarization and left-handed circular polarization orthogonal to each other. The two polarization states are made orthogonal to each other for subsequent combination. Optionally, angles between fast axis directions of the first quarter-wave plate 6 and the second quarter-wave plate 7 and a polarization direction of the laser are respectively 45 degrees and 135 degrees. Optionally, a polarization direction of the laser light generated by the laser source 1 is a vertical direction.

The second lens 8 is configured to focus the first Laguerre-Gaussian mode beam and the second Laguerre-Gaussian mode beam with the polarization states being circular polarization. The first lens 4 and the second lens 8 form a 4f system.

The beam combining element 9 is configured to: combine the focused first Laguerre-Gaussian mode beam and second Laguerre-Gaussian mode beam into one beam, and generate a plurality of diffracted beams, to obtain a polarized propagation-invariant light field. Optionally, the beam combining element 9 is a Ronchi grating. To ensure full combination of the two Laguerre-Gaussian mode beams, the Ronchi grating is disposed at a focus of the second lens 8. An intermediate diffraction order of a plurality of diffracted beams is the best propagation-invariant light field, and other diffraction orders are flawed.

Figure 3:
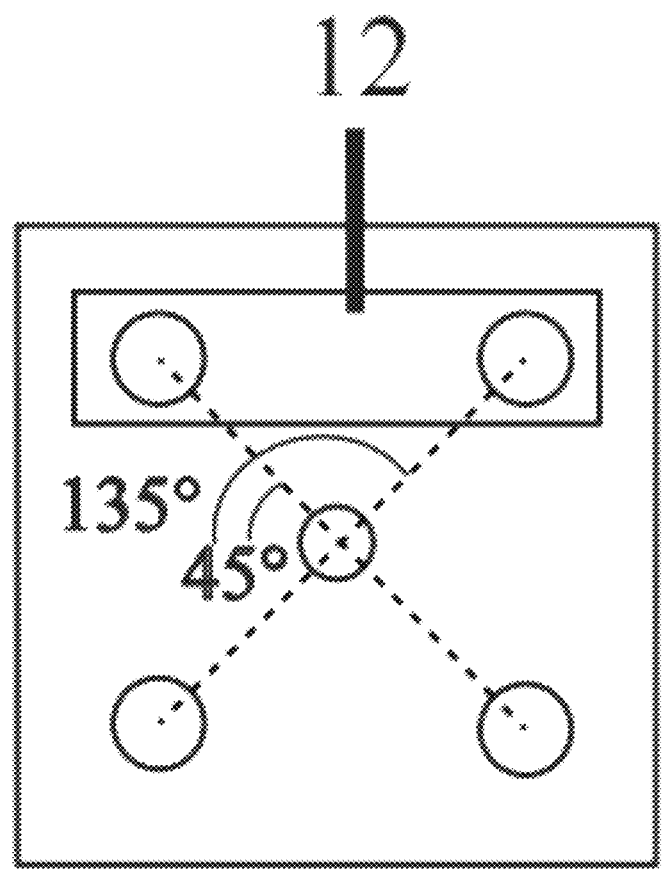
FIG. 3 is a schematic diagram of a shading element according to a preferred embodiment of the present invention.

As shown in FIG. 3, optionally, the shading element 5 is a shading plate. A through hole 12 is provided in the shading plate. The through hole 12 is separately configured to filter out the positive first-order diffracted beams and the negative first-order diffracted beams of the first Laguerre-Gaussian mode beam and the second Laguerre-Gaussian mode beam. In FIG. 3, the circle in the middle represents a zeroth-order diffracted light. Four circles around the circle represent two positive first-order diffracted beams and two negative first-order diffracted beams. Two circles in the through hole 12 represent two positive first-order diffracted beams or two negative first-order diffracted beams.

To prevent excessive high optical intensity from damaging subsequent devices, optionally, the system further includes a neutral density filter 2. The neutral density filter 2 is disposed between the laser source 1 and the spatial light modulator 3. The laser light generated by the laser source 1 passes through the neutral density filter 2 to enter the spatial light modulator 3.

To observe a polarization property of the polarized propagation-invariant light field on the beam combining element 9, further, the system further includes a beam analyzer 10, disposed behind the beam combining element 9. Optionally, it is only necessary to observe the light field of the zeroth-order diffracted light in the middle with the highest intensity.

The technical principle of the present invention is as follows.

The focus of the present invention is to use a spatial light modulator to simultaneously generate two Laguerre-Gaussian beams that satisfy a particular Gouy order relationship, use an optical device to modulate two Laguerre-Gaussian beams into orthogonal uniformly polarized light, and use a Ronchi grating to stably combine the uniformly polarized light into a type of light field with a polarization state remains unchanged.

First, the spatial light modulator needs to be used to simultaneously generate two Laguerre-Gaussian beams that satisfy a particular Gouy order relationship. It is known that the expression of an electric field of a Laguerre-Gaussian beam is:

$$LG_l^p = \sqrt{\frac{2p!}{\pi(p+|l|)!}} \frac{1}{\omega_z} \left(\frac{r\sqrt{2}}{\omega_z}\right)^{|l|} L_p^{|l|}\left(\frac{2r^2}{\omega_z^2}\right) \exp\left(\frac{-r^2}{\omega_z^2}\right) \times \quad (1)$$

-continued
$$\exp\left(\frac{-ikr^2}{2R_z}\right) \exp\left[-i(2p+|l|+1)\arctan\left(\frac{z}{z_R}\right)\right] \exp(il\phi).$$

l represents a topological charge of an LG beam. p represents a radial index. $\omega_z=\omega_0\sqrt{1+(z/z_R)^2}$ is a waist width of the beam when being propagated at a position z. $\omega_0$ is an initial waist width. $Z_R$ is a Rayleigh length. $L_p^{|l|}(\bullet)$ represents a generalized Laguerre polynomial. k is a wave number. $R_z=z[1+(z_R/z)^2]$ radius of curvature of a wave front. $\exp[-i(2p+|l|+1)\arctan(z/z_R)]$ is referred to as a Gouy phase $\exp(il\phi)$ is referred to as a vortex phase factor. As can be found from Formula (1), when a Laguerre-Gaussian beam with a single mode is propagated in free space, apart from essential beam scaling, at any propagation distance, the shape of the cross section of the spot of the beam remains unchanged.

In another aspect, when a non-uniformly polarized light field is generated, two polarized orthogonal uniformly polarized beams are usually superimposed. Therefore, left- and right-handed Laguerre-Gaussian beams may be combined into a complex non-uniformly polarized light field with polarization types including linear polarization, elliptical polarization, and circular polarization. For convenience, the electric fields of two Laguerre-Gaussian beams to be combined are respectively represented as $LG_{l_1}^{p_1}$ and $LG_{l_2}^{p_2}$. An electric field formed by superimposing the right-handed $LG_{l_1}^{p_1}$ and the left-handed $LG_{l_2}^{p_2}$ may be represented as:

$$\Psi(LG_l^p) = LG_{l_1}^{p_2}|R\rangle + LG_{l_2}^{p_2}|L\rangle \quad (2)$$

$\Psi(LG_l^p)$ represents the electric field of the combined light field. $|R\rangle$ represent $|L\rangle$ the right-handed direction and the left-handed direction. The two directions may be represented by an x direction and a y direction in a Cartesian coordinate system. Formula (1) is substituted into Formula (2), and the optical intensity of the combined non-uniformly polarized light field may be represented as:

$$I(LG_l^p) = |\Psi(LG_l^p)|^2 = |LG_{l_1}^{p_1}|^2 + |LG_{l_2}^{p_2}|^2 \quad (3)$$

In fact, when two polarized orthogonal Laguerre-Gaussian mode beams are combined into a non-uniformly polarized light field, a polarization mode in the cross section of the combined light field is determined by amplitude and phase ratios of two mode components at all points in the cross section. For example, if an amplitude ratio of a mode component keeps increasing in a propagation process at a point in the cross section of the combined light field, the polarization at the point changes toward the mode component. Therefore, to generate a polarized propagation-invariant light field, it needs to be ensured that at any point in a combined beam, the amplitude and phase ratios of the two mode components remain constant, and it is necessary to make Gouy phases of the two modes change in the same manner.

A new physical quantity is proposed: a Gouy phase order of a Laguerre-Gaussian beam:

$$N=2p+|l|.$$

To make Gouy phase items of two Laguerre-Gaussian mode beams to be combined change in the same manner and at the same speed in a propagation process, Gouy phase orders of the two beams need to satisfy:

$$2p_1+|l_1|=2p_2+|l_2| \quad (4).$$

The two orthogonal polarized Laguerre-Gaussian mode beams satisfying the foregoing condition are superimposed, so that a polarized propagation-invariant light field with complex polarization types may be generated.

In the method and system for generating a polarized propagation-invariant light field of the present invention, two Laguerre-Gaussian mode beams that satisfy a condition $2p_1+|l_1|=2p_2+|l_2|$ are generated, and orthogonal uniformly polarization is applied to the two Laguerre-Gaussian mode beams. The two Laguerre-Gaussian mode beams are then focused onto a Ronchi grating to be stably combined into polarized propagation-invariant light field. The light field generated in the present invention simultaneously has linear polarization, elliptical polarization, and circular polarization in a cross section of the light field, and in a propagation process of the light field in free space, apart from normal spot size scaling, polarization distribution remains unchanged.

Embodiment 2

This embodiment discloses a method for generating a polarized propagation-invariant light field, including the following steps:

S1: Generate laser light to enter a spatial light modulator 3. Specifically, the laser source 1 generates laser light.

S2: Generate two holograms, superimpose grating functions of the two holograms to obtain a composite hologram, and load the composite hologram into the spatial light modulator 3, where the spatial light modulator 3 modulates the laser light and simultaneously generates a first Laguerre-Gaussian mode beam and a second Laguerre-Gaussian mode beam, and the first Laguerre-Gaussian mode beam and the second Laguerre-Gaussian mode beam satisfy:

$$2p_1+|l_1|=2p_2+|l_2|,$$

where $p_1$ and $p_2$ respectively represent radial indices of the first Laguerre-Gaussian mode beam and the second Laguerre-Gaussian mode beam, and $l_1$ and $l_2$ respectively represent topological charges of the first Laguerre-Gaussian mode beam and the second Laguerre-Gaussian mode beam.

Specifically, the computer 11 generates two holograms, superimposes grating functions of the two holograms to obtain a composite hologram, and loads the composite hologram into the spatial light modulator 3.

S3: Collimate the first Laguerre-Gaussian mode beam and the second Laguerre-Gaussian mode beam. Optionally, the first lens 4 collimates the first Laguerre-Gaussian mode beam and the second Laguerre-Gaussian mode beam.

S4: Simultaneously filter out positive the first-order diffracted beam and the negative first-order diffracted beam of the first Laguerre-Gaussian mode beam and the second Laguerre-Gaussian mode beam after the collimation. Optionally, the shading element 5 simultaneously filters out positive first-order diffracted beams and negative first-order diffracted beams of the first Laguerre-Gaussian mode beam and the second Laguerre-Gaussian mode beam after the collimation.

As shown in FIG. 3, optionally, the shading element 5 is a shading plate. A through hole 12 is provided in the shading plate. The through hole 12 is separately configured to filter out the positive first-order diffracted beams and the negative first-order diffracted beams of the first Laguerre-Gaussian mode beam and the second Laguerre-Gaussian mode beam.

In FIG. 3, the circle in the middle represents a zeroth-order diffracted light. Four circles around the circle represent two positive first-order diffracted beams and two negative first-order diffracted beams. Two circles in the through hole 12 represent two positive first-order diffracted beams or two negative first-order diffracted beams.

S5: Modulate polarization states of the first Laguerre-Gaussian mode beam and the second Laguerre-Gaussian mode beam after filtering from linear polarization to right-handed circular polarization and left-handed circular polarization orthogonal to each other. Specifically, the first quarter-wave plate 6 and the second quarter-wave plate 7 are configured to modulate polarization states of the first Laguerre-Gaussian mode beam and the second Laguerre-Gaussian mode beam after filtering from linear polarization to right-handed circular polarization and left-handed circular polarization orthogonal to each other. Optionally, angles between fast axis directions of the first quarter-wave plate 6 and the second quarter-wave plate 7 and a polarization direction of the laser are respectively 45 degrees and 135 degrees. Optionally, a polarization direction of the laser light generated by the laser source 1 is a vertical direction.

S6: Focus the first Laguerre-Gaussian mode beam and the second Laguerre-Gaussian mode beam with the polarization states being circular polarization. Specifically, the second lens 8 focuses the first Laguerre-Gaussian mode beam and the second Laguerre-Gaussian mode beam with the polarization states being circular polarization. The first lens 4 and the second lens 8 form a 4f system.

S7: Combine the focused first Laguerre-Gaussian mode beam and second Laguerre-Gaussian mode beam into one beam, and generate a plurality of diffracted beams, to obtain a polarized propagation-invariant light field. Specifically, the beam combining element 9 is configured to: combine the focused first Laguerre-Gaussian mode beam and second Laguerre-Gaussian mode beam into one beam, and generate a plurality of diffracted beams, to obtain a polarized propagation-invariant light field. Optionally, the beam combining element 9 is a Ronchi grating. To ensure full combination of the two Laguerre-Gaussian mode beams, the Ronchi grating is disposed at a focus of the second lens 8.

The technical principle of the method for generating a polarized propagation-invariant light field in this embodiment is similar to that in the foregoing Embodiment 1. Details are not described again herein.

The foregoing embodiments are merely preferred embodiments used to fully describe the present invention, and the scope of protection of the present invention is not limited thereto. Equivalent replacements or variations made by a person skilled in the art to the present invention all fall within the scope of protection of the present invention. The scope of protection of the present invention is as defined in the claims.

What is claimed is:

1. A system for generating a polarized propagation-invariant light field, comprising:
a laser source and a spatial light modulator, wherein the laser source is configured to generate laser light to enter the spatial light modulator;
a computer, configured to: generate two holograms, superimpose grating functions of the two holograms to obtain a composite hologram, and load the composite hologram into the spatial light modulator, wherein the spatial light modulator is configured to modulate the laser light and simultaneously generate a first Laguerre-Gaussian mode beam and a second Laguerre-Gaussian mode beam, and the first Laguerre-Gaussian mode beam and the second Laguerre-Gaussian mode beam satisfy:

$$2p_1+|l_1|=2p_2+|l_2|,$$

wherein $p_1$ and $p_2$ respectively represent radial indices of the first Laguerre-Gaussian mode beam and the second Laguerre-Gaussian mode beam, and $l_1$ and $l_2$ respectively represent topological charges of the first Laguerre-Gaussian mode beam and the second Laguerre-Gaussian mode beam;

a first lens, configured to collimate the first Laguerre-Gaussian mode beam and the second Laguerre-Gaussian mode beam;

a shading element, configured to simultaneously filter out a positive first-order diffracted beam and a negative first-order diffracted beam of the first Laguerre-Gaussian mode beam and the second Laguerre-Gaussian mode beam after the collimation;

a first quarter-wave plate and a second quarter-wave plate, configured to modulate polarization states of the first Laguerre-Gaussian mode beam and the second Laguerre-Gaussian mode beam after filtering from linear polarization to right-handed circular polarization and left-handed circular polarization orthogonal to each other;

a second lens, configured to focus the first Laguerre-Gaussian mode beam and the second Laguerre-Gaussian mode beam with the polarization states being circular polarization; and a beam combining element, configured to: combine the focused first Laguerre-Gaussian mode beam and second Laguerre-Gaussian mode beam into one beam, and generate a plurality of diffracted beams, to obtain a polarized propagation-invariant light field.

2. The system for generating a polarized propagation-invariant light field according to claim 1, wherein the shading element is a shading plate, a through hole is provided in the shading plate, and the through hole is configured to filter out the positive first-order diffracted beam and the negative first-order diffracted beam of the first Laguerre-Gaussian mode beam and the second Laguerre-Gaussian mode beam.

3. The system for generating a polarized propagation-invariant light field according to claim 1, wherein angles between fast axis directions of the first quarter-wave plate and the second quarter-wave plate and a polarization direction of the laser light are respectively 45 degrees and 135 degrees.

4. The system for generating a polarized propagation-invariant light field according to claim 1, further comprising a neutral density filter, wherein the neutral density filter is disposed between the laser source and the spatial light modulator, and the laser light generated by the laser source passes through the neutral density filter to enter the spatial light modulator.

5. The system for generating a polarized propagation-invariant light field according to claim 1, further comprising a beam analyzer, disposed behind the beam combining element, and configured to observe a polarization property of the polarized propagation-invariant light field on the beam combining element.

6. The system for generating a polarized propagation-invariant light field according to claim 1, wherein the first lens and the second lens form a 4f system.

7. The system for generating a polarized propagation-invariant light field according to claim 1, wherein a polarization direction of the laser light generated by the laser source is a vertical direction.

8. The system for generating a polarized propagation-invariant light field according to claim 1, wherein the beam combining element is a Ronchi grating.

9. The system for generating a polarized propagation-invariant light field according to claim 8, wherein the Ronchi grating is disposed at a focus of the second lens.

10. A method for generating a polarized propagation-invariant light field, comprising the following steps:
S1: generating laser light to enter a spatial light modulator;
S2: generating two holograms, superimposing grating functions of the two holograms to obtain a composite hologram, and loading the composite hologram into the spatial light modulator, wherein the spatial light modulator modulates the laser light and simultaneously generates a first Laguerre-Gaussian mode beam and a second Laguerre-Gaussian mode beam, and the first Laguerre-Gaussian mode beam and the second Laguerre-Gaussian mode beam satisfy:

$$2p_1+|l_1|=2p_2+|l_2|,$$

wherein $p_1$ and $p_2$ respectively represent radial indices of the first Laguerre-Gaussian mode beam and the second Laguerre-Gaussian mode beam, and $l_1$ and $l_2$ respectively represent topological charges of the first Laguerre-Gaussian mode beam and the second Laguerre-Gaussian mode beam;
S3: collimating the first Laguerre-Gaussian mode beam and the second Laguerre-Gaussian mode beam;
S4: simultaneously filtering out positive first-order diffracted beams and negative first-order diffracted beams of the first Laguerre-Gaussian mode beam and the second Laguerre-Gaussian mode beam after the collimation;
S5: modulating polarization states of the first Laguerre-Gaussian mode beam and the second Laguerre-Gaussian mode beam after filtering from linear polarization to right-handed circular polarization and left-handed circular polarization orthogonal to each other;
S6: focusing the first Laguerre-Gaussian mode beam and the second Laguerre-Gaussian mode beam with the polarization states being circular polarization; and
S7: combining the focused first Laguerre-Gaussian mode beam and second Laguerre-Gaussian mode beam into one beam, and generating a plurality of diffracted beams, to obtain a polarized propagation-invariant light field.

* * * * *